US012711698B2

(12) United States Patent
Wang

(10) Patent No.: US 12,711,698 B2
(45) Date of Patent: Aug. 18, 2026

(54) METHOD, APPARATUS, ELECTRONIC DEVICE, AND STORAGE MEDIUM FOR RENDERING THREE-DIMENSIONAL VIEW

(71) Applicant: Beijing Bytedance Network Technology Co., Ltd., Beijing (CN)

(72) Inventor: Guangwei Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 50 days.

(21) Appl. No.: 18/712,636

(22) PCT Filed: Nov. 21, 2022

(86) PCT No.: PCT/CN2022/133088

§ 371 (c)(1),
(2) Date: May 22, 2024

(87) PCT Pub. No.: WO2023/088453

PCT Pub. Date: May 25, 2023

(65) Prior Publication Data

US 2025/0005848 A1 Jan. 2, 2025

(30) Foreign Application Priority Data

Nov. 22, 2021 (CN) ......................... 202111389308.6

(51) Int. Cl.
*G06T 17/20* (2006.01)
*G06T 5/50* (2006.01)
(Continued)

(52) U.S. Cl.
CPC .............. *G06T 15/506* (2013.01); *G06T 5/50* (2013.01); *G06T 7/90* (2017.01); *G06T 15/08* (2013.01); *G06T 2207/20221* (2013.01)

(58) Field of Classification Search
CPC ........... G06T 15/506; G06T 5/50; G06T 7/90; G06T 15/08; G06T 2207/20221;
(Continued)

(56) References Cited

U.S. PATENT DOCUMENTS

| | | | | |
|---|---|---|---|---|
| 10,964,099 | B2 * | 3/2021 | Ghosh | G01N 21/55 |
| 11,443,484 | B2 * | 9/2022 | Vesdapunt | G06T 17/00 |

(Continued)

FOREIGN PATENT DOCUMENTS

| | | | |
|---|---|---|---|
| CN | 110310224 | A | 10/2019 |
| CN | 111815508 | A | 10/2020 |

(Continued)

OTHER PUBLICATIONS

ISA China National Intellectual Property Administration, International Search Report Issued in Application No. PCT/CN2022/133088, Feb. 14, 2023, WIPO, 4 pages.

Mildenhall, B et al., "NeRF: Representing Scenes as Neural Radiance Fields for View Synthesis," Proceedings of the 16th European Conference on Computer Vision (ECCV 2020), Aug. 23, 2020, Virtual, 17 pages.

*Primary Examiner* — Philip P. Dang
(74) *Attorney, Agent, or Firm* — Alleman Hall LLP

(57) ABSTRACT

The disclosure provides a method and apparatus for rendering a three-dimensional view, an electronic device, and a storage medium. The method for rendering a three-dimensional view includes: obtaining a plurality of images to be processed and photographing attribute information of the images to be processed; processing, for each image to be processed, a current image to be processed based on a pre-trained target illumination estimation model to obtain target spherical harmonic illumination corresponding to the current image to be processed; processing, for each image to be processed, photographing attribute information of the current image to be processed based on a pre-trained target object attribute determination model to obtain target object attribute information corresponding to the current image to (Continued)

Obtain a plurality of second images to be trained at a plurality of camera viewing angles, and determine a plurality of second training samples based on the plurality of second images to be trained and the corresponding camera viewing angles Use, for each second training sample, a camera viewing angle in a second current training sample as an input parameter of an object attribute determination model to be trained, and obtain actual voxel position information, actual color information and actual material parameter information output by the object attribute determination model to be trained corresponding to the second current training sample Input the second image to be trained in the second current training sample into a target illumination estimation model, and obtain spherical harmonic illumination to be used corresponding to the second current training sample Correct a model parameter in the object attribute determination model to be trained according to the second image to be trained, the spherical harmonic illumination to be used, the actual voxel position information, the actual color information and the actual material parameter information of the second current training sample Use convergence of a second preset loss function in the object attribute determination model to be trained as a training target to obtain a target object attribute determination model Obtain a plurality of images to be processed and photographing attribute information of the images to be processed Process, for each image to be processed, a current image to be processed based on a pre-trained target illumination estimation model, and obtain target spherical harmonic illumination corresponding to the current image to be processed Process, for each image to be processed, photographing attribute information of the current image to be processed based on a pre-trained target object attribute determination model to obtain target object attribute information corresponding to the current image to be processed Determine a target image corresponding to each image to be processed according to target spherical harmonic illumination and target object attribute information of the image to be processed, and determine a target three-dimensional view based on a plurality of target images be processed; and determining a target image corresponding to each image to be processed according to target spherical harmonic illumination and target object attribute information of each image to be processed.

15 Claims, 5 Drawing Sheets

(51) Int. Cl.

| | |
|---|---|
| ***G06T 7/90*** | (2017.01) |
| ***G06T 15/08*** | (2011.01) |
| ***G06T 15/50*** | (2011.01) |

(58) Field of Classification Search

CPC . G06T 2207/20084; G06T 3/00; G06T 15/20; G06T 17/00; G06T 15/005; G06T 15/06; G06N 3/04; G06N 3/08

See application file for complete search history.

(56) References Cited

U.S. PATENT DOCUMENTS

| | | | | |
|---|---|---|---|---|
| 2018/0310025 | A1* | 10/2018 | Keränen | G06T 17/005 |
| 2019/0108646 | A1 | 4/2019 | Wang et al. | |
| 2021/0357555 | A1* | 11/2021 | Liu | G06F 30/23 |

FOREIGN PATENT DOCUMENTS

| | | | | | |
|---|---|---|---|---|---|
| CN | 111951372 | A | | 11/2020 | |
| CN | 112070888 | A | | 12/2020 | |
| CN | 112330788 | A | | 2/2021 | |
| CN | 112489144 | A | | 3/2021 | |
| CN | 111951381 | B | * | 5/2024 | G06T 17/00 |
| KR | 100609145 | B1 | * | 8/2006 | G06T 15/55 |
| KR | 1020170090199 | A | | 8/2017 | |

* cited by examiner 600
601
Processing apparatus
602
ROM
603
RAM
604
605
I/O interface
606
607
608
609
Input apparatus
Output apparatus
Storage apparatus
Communic -ation apparatus

METHOD, APPARATUS, ELECTRONIC DEVICE, AND STORAGE MEDIUM FOR RENDERING THREE-DIMENSIONAL VIEW

CROSS-REFERENCE TO RELATED APPLICATION(S)

The disclosure is a national stage application filed under 35 U.S.C. 371 based on International Patent Application No. PCT/CN2022/133088, filed Nov. 21, 2022, which claims the priority to the Chinese Patent Application No. 202111389308.6, filed to the Chinese Patent Office on Nov. 22, 2021, which is incorporated in its entirety herein by reference.

FIELD

The disclosure relates to the technical field of computers, and for instance, relates to method, apparatus an electronic device, and a storage medium for rendering a three-dimensional view.

BACKGROUND

Image rendering is one of the important research directions in graphics. A traditional method for rendering an image is generally to synthesize a virtual viewing angle based on a multi-viewing angle technology. A texture image and a depth image of an object are obtained, such that an image of the object at a new viewing angle is synthesized by a texture image and a depth image of an existing viewing angle.

However, in a process of rendering the object, a rendered image is not consistent with an image of an actual object, which leads to low accuracy of the rendered image and poor user experience.

SUMMARY

The disclosure provides a method, apparatus, electronic device, and storage medium for rendering a three-dimensional view, so as to achieve a technical effect that a rendered view is more consistent with a view of an actual object, and further accuracy of image rendering is improved.

In a first aspect, the disclosure provides a method for rendering a three-dimensional view. The method includes:

obtaining a plurality of images to be processed and photographing attribute information of the images to be processed;

processing, for each image to be processed, a current image to be processed based on a pre-trained target illumination estimation model to obtain target spherical harmonic illumination corresponding to the current image to be processed;

processing, for each image to be processed, photographing attribute information of the current image to be processed based on a pre-trained target object attribute determination model to obtain target object attribute information corresponding to the current image to be processed; and determining a target image corresponding to each image to be processed according to target spherical harmonic illumination and target object attribute information of each image to be processed, and determining a target three-dimensional view based on a plurality of target images.

In a second aspect, the disclosure further provides an apparatus for rendering a three-dimensional view. The apparatus includes:

a photographing attribute information obtaining module configured to obtain a plurality of images to be processed and photographing attribute information of the images to be processed;

a target spherical harmonic illumination obtaining module configured to process, for each image to be processed, a current image to be processed based on a pre-trained target illumination estimation model to obtain target spherical harmonic illumination corresponding to the current image to be processed;

a target object attribute information obtaining module configured to process, for each image to be processed, photographing attribute information of the current image to be processed based on a pre-trained target object attribute determination model to obtain target object attribute information corresponding to the current image to be processed; and a target three-dimensional view determination module configured to determine a target image corresponding to each image to be processed according to target spherical harmonic illumination and target object attribute information of each image to be processed, and determine a target three-dimensional view based on a plurality of target images.

In a third aspect, the disclosure further provides an electronic device. The electronic device includes:

one or more processors; and a storage apparatus configured to store one or more programs.

When the one or more processors execute the one or more programs, the one or more processors implement the above method for rendering a three-dimensional view.

In a fourth aspect, the disclosure further provides a computer-readable storage medium, which stores a computer program. The computer program implements the above method for rendering a three-dimensional view when being executed by a processor.

DETAILED DESCRIPTION OF EMBODIMENTS

Examples of the disclosure will be described below with reference to the accompanying drawings. Although some examples of the disclosure are shown in the accompanying drawings, the disclosure may be implemented in various forms, and the examples are provided for understanding of the disclosure. The drawings and the examples of the disclosure are only for illustrative purposes.

A plurality of steps described in method embodiments of the disclosure may be executed in a different order and/or in parallel. Further, the method embodiments may include additional steps and/or omit execution of the illustrated steps, which do not limit the scope of the disclosure.

The terms "include" and "comprise" used herein and their variations are open-ended, that is, "including but not limited to" and "comprising but not limited to". The term "based on" means "at least partly based on". The term "an example" means "at least one example". The term "another example" means "at least another example". The term "some examples" means "at least some examples". Related definitions of other terms will be given in the following description.

Concepts such as "first" and "second" mentioned in the disclosure are only used to distinguish different apparatuses, modules or units, and are not used to limit an order or interdependence of functions executed by the apparatuses, modules or units.

Modification with "a", "an" or "a plurality of" mentioned in the disclosure is illustrative rather than limitative, and should be understood by those skilled in the art as "one or more" unless stated otherwise in the context.

Embodiment 1

Figure 1:
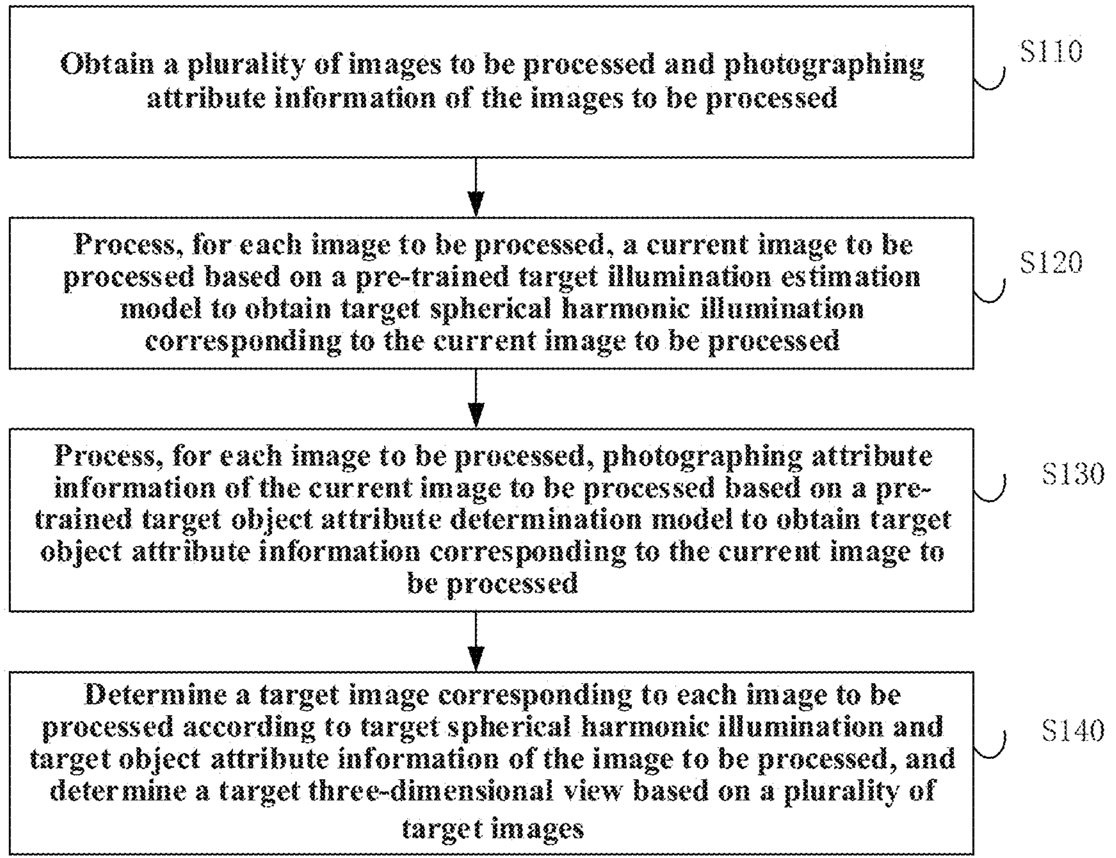
FIG. 1 is a schematic flow diagram of a method for rendering a three-dimensional view according to Embodiment 1 of the disclosure.

FIG. 1 is a schematic flow diagram of a method for rendering a three-dimensional view according to Embodiment 1 of the disclosure. The example is suitable for a case of rendering a three-dimensional view corresponding to a target object. The method may be executed by an apparatus for rendering a three-dimensional view. The apparatus may be implemented in a form of software and/or hardware. The hardware may be an electronic device, such as a mobile terminal, a personal computer (PC) terminal, or a server.

As shown in FIG. 1, the method of the embodiment includes the following steps:

S110, a plurality of images to be processed and photographing attribute information of the images to be processed are obtained.

There may be one or more images to be processed. The number of images to be processed and accuracy of a rendered three-dimensional view have a corresponding relation. In an example, the number of images to be processed may be multiple. Each image to be processed may be an image obtained by photographing a specific object from a specific viewing angle. Meanwhile, the image to be processed may reflect a shape, texture and structural information of a target object in different environmental states. An object included in the image to be processed may be used as the target object. The photographing attribute information may be photographing viewing angle information and position information when the target object is photographed.

The photographing attribute information may be a photographing viewing angle. The photographing viewing angle may be represented by parameters of at least three dimensions, and for instance, parameters of six dimensions. 3 three dimensions are used to represent the position information of a photographing camera and 3 parameters are used to represent rotation angle information of the photographing camera.

For convenience of image photographing, a photographing apparatus may be fixed to a rotating sphere, and the target object is placed in a rotation center. The rotating sphere is rotated, such that images of the target object from different viewing angles may be obtained.

In the embodiment, there are various methods for obtaining the plurality of images to be processed and the photographing attribute information of the images to be processed. A first method may be as follows: each time after an image to be processed at a viewing angle is photographed, the image to be processed is stored in a cache space. After the images to be processed at a plurality of viewing angles are obtained, the plurality of images to be processed in the cache space are processed in sequence, such that a corresponding target image is obtained, and further a corresponding target three-dimensional schematic diagram is obtained. Another processing method may be as follows: the photographing apparatus is in communication with a corresponding electronic device, the electronic device may execute a solution according to the example of the disclosure, the images to be processed photographed by the photographing apparatus are transmitted to the electronic device, and further the images to be processed are processed based on the electronic device, such that the target image corresponding to each image to be processed is obtained.

In the example, a method for processing the image to be processed is not limited herein, as long as the technical solution of the example of the disclosure is implemented.

In the example, the step that the plurality of images to be processed and the photographing attribute information of the images to be processed are obtained includes the following steps: a camera viewing angle corresponding to the image to be processed is determined, and the camera viewing angle is used as the photographing attribute information of the image to be processed.

The camera viewing angle may be the photographing attribute information. The target object may be photographed with the photographing apparatus at different photographing angles. The photographing angle may be used as the photographing attribute information, that is, the camera viewing angle. For instance, when the target object is photographed with the photographing apparatus, the target object may be fixed. Meanwhile, a circle having a certain radius is made with the target object as a center and the photographing apparatus as an end point of the radius. The photographing angle of the photographing apparatus for photographing the target object is adjusted, such that an image to be processed including a target object image is obtained. When each image to be processed is obtained, the image to be processed and the photographing attribute information may be used as a set of number pairs based on the photographing attribute information corresponding to the image to be processed, so as to be used to determine the target image corresponding to the image to be processed later.

S120, for each image to be processed, a current image to be processed is processed based on a pre-trained target illumination estimation model to obtain target spherical harmonic illumination corresponding to the current image to be processed.

The target illumination estimation model may be pre-trained to determine spherical harmonic illumination information of each image to be processed. The spherical harmonic illumination information may be information of ambient light around the target object. For instance, the ambient light around the target object may be sampled, sampled information may be divided into a preset number of coefficients, and then illumination may be represented by the information of the preset number of coefficients through an image rendering technology, such that coefficient representation information obtained may be used as spherical harmonic illumination of the target object. The spherical harmonic illumination information may include geometrical information, color, energy and speed of light.

The plurality of images to be processed are sequentially input into the target illumination estimation model, spherical harmonic illumination corresponding to each image to be processed may be obtained, and the spherical harmonic illumination of each image to be processed may be used as target spherical harmonic illumination. In order to clearly introduce the technical solution, introduction will be provided below with processing of one of the images to be processed as an instance. Accordingly, an image currently being processed is used as the current image to be processed.

In actual application, the image to be processed may be processed based on the target illumination estimation model as follows: the current image to be processed is used as input of the target illumination estimation model, and the target illumination estimation model may output illumination estimation information corresponding to the current image to be processed. In this case, the illumination estimation information may be target spherical harmonic illumination information.

The steps that the current image to be processed is processed based on the pre-trained target illumination estimation model to obtain the target spherical harmonic illumination corresponding to the current image to be processed include the following steps: the current image to be processed is used as an input parameter of the target illumination estimation model to obtain the target spherical harmonic illumination corresponding to the current image to be processed output by the target illumination estimation model.

The input parameters may be a set of variable parameters that represent the illumination estimation information and are input into the target illumination estimation model from an exterior of a system. In the solution, the input parameter is the current image to be processed. The current image to be processed is used as the input parameter of the target illumination estimation model. The model may output geometrical information, color, energy and speed of illumination corresponding to the current image to be processed. The illumination information may be used as the target spherical harmonic illumination.

For instance, jade images to be processed under three illumination effects are input into the target illumination estimation model in sequence, and geometrical information, color, energy and/or speed of illumination corresponding to the images to be processed may be obtained, that is, the target spherical harmonic illumination information.

S130, for each image to be processed, photographing attribute information of the current image to be processed is processed based on a pre-trained target object attribute determination model to obtain target object attribute information corresponding to the current image to be processed.

Each image to be processed may be processed through the above method. In order to introduce the technical solution, introduction may be provided with processing of one of the images as an instance. Accordingly, an image currently being processed is used as the current image to be processed.

The target object attribute determination model may be a pre-trained deep learning model, and is used to process the image to be processed and output a corresponding result. The output result may be the target object attribute information.

In the example embodiment, the target object attribute information may reflect parameter information of effects presented by the target object in reality from a plurality of dimensions, which includes parameter information such as material information, shape information (geometrical information), color, texture, smoothness and transparency of the target object. Illustration is further conducted with the above examples. For instance, the target object may be jade. When at least three images to be processed corresponding to jade are determined, and photographing parameter information of each image to be processed is recorded, photographing attribute information corresponding to a current image to be processed may be used as an input parameter of a target object attribute determination model. The target object attribute determination model may output information such as material information, color, texture, and transparency of the jade in the current image to be processed.

After the target object attribute information corresponding to each image to be processed is determined, the information may be stored in a specific repository and marked with corresponding labels, such that the information may be directly invoked in a subsequent image processing process, and a technical effect of data invocation convenience is improved.

In the example, the target object attribute information at least includes voxel position information, color information and material parameter information. The steps that the photographing attribute information of the current image to be processed is processed based on the pre-trained target object attribute determination model to obtain the target object attribute information corresponding to the current image to be processed include the following steps: a camera viewing angle in the photographing attribute information of the current image to be processed is used as an input parameter of the target object attribute determination model to obtain at least voxel position information, color information and material parameter information of a target object in the current image to be processed output by the target object attribute determination model.

A voxel may be a minimum unit of division of volume information of the target object in a three-dimensional space, and may be described by a three-dimensional array having a corresponding value. The voxel position information may be position information of the voxel of the target object in the three-dimensional space. For instance, the target object may be translucent jade, and the three-dimensional space may be a three-dimensional data field corresponding to the translucent jade. A series of jade image slice data may be compiled according to a computer program, and the slice data may be regularized according to information such as position and angle. Then a regular data field composed of uniform grids in the three-dimensional space is formed. Each node on the grid describes density and other attribute information of a structural object in jade. A small cube defined by eight corresponding nodes between adjacent layers may be used as a minimum unit in the three-dimensional data field, which is expressed as a voxel. A position of the small cube is a voxel position, and a plurality of pieces of voxel information may be configured to represent a plurality of structural objects in the translucent jade. Accordingly, all voxel information of an object may describe an internal structure of the object. The color information may be color information of the voxel of the target object under illumination. For instance, color information of the voxel may be expressed by red-green-blue (RGB) colors. For instance, color information of each voxel is obtained through changes of three colors Channel of red (R), green (G) and blue (B) and superposition of the three colors, and is used as the color information in the target object attribute information. The material parameter information indicates roughness, metallicity and anisotropy of a structure in the target object. The voxel position information, the color information and the material parameter information of the target object may be used as the target object attribute information. The target object attribute information may include, but is not limited to, the attribute information.

S140, a target image corresponding to each image to be processed is determined according to target spherical harmonic illumination and target object attribute information of the image to be processed, and a target three-dimensional view is determined based on a plurality of target images.

The target image may be an image rendered according to the target spherical harmonic illumination and the target object attribute information, and for instance, based on the voxel position information, the color information and the material parameter information in the target object attribute information and the target spherical harmonic illumination, and each voxel structure in the target object may be rendered through a modeling technology, such that the target image corresponding to the target object may be obtained. The target three-dimensional view may be an image of the target object seen by a user. Generally, objects seen by the user in a real world are mostly three-dimensional. Accordingly, in order to make an image displayed on a display interface consistent with an image seen by the user, a three-dimensional view may be rendered.

In the example, after the current image to be processed is input into the target illumination estimation model and the target spherical harmonic illumination is obtained, the current image to be processed may be input into the target object attribute determination model, such that the target object attribute information corresponding to the image to be processed is obtained. Alternatively, the target object attribute information of each image to be processed may be determined after the target spherical harmonic illumination of all the images to be processed is obtained. A processing order and a processing method are not limited herein, as long as the target spherical harmonic illumination and object attribute information of each image to be processed are obtained.

When the target image corresponding to each image to be processed is determined, target spherical harmonic illumination and target object attribute information of the same image have to be processed, and a corresponding target image is obtained.

The target spherical harmonic illumination and the target object attribute information corresponding to each image to be processed are processed based on a renderer, such that the target image corresponding to the image to be processed is obtained. In order to obtain the three-dimensional view corresponding to the target object, the plurality of target images may be subjected to fusion, and a target three-dimensional view corresponding to the target object is obtained.

The example of the disclosure firstly obtains the plurality of images to be processed and the photographing attribute information of the images to be processed, processes the images to be processed according to the target illumination estimation model so as to obtain target spherical harmonic illumination information, then processes the photographing attribute information according to the target object attribute determination model, obtains object attribute information of the target object, and finally renders the corresponding target image based on the target spherical harmonic illumination and the object attribute information of each image to be processed, such that the corresponding three-dimensional view is rendered based on the plurality of target images. In this way, a technical problem that a rendered image is not consistent with an image of an actual object, which leads to low accuracy of the rendered image and poor user experience in the related art is solved. Not only light source information but also camera position information is considered in a process of rendering an image, such that a corresponding light source position and the material parameter information of the target object are determined, and further the three-dimensional view corresponding to the target object is accurately rendered based on the above information. Accuracy of view rendering is improved, and a more accurate three-dimensional view is displayed on a display interface, which can improve user experience.

Embodiment 2

Figure 2:
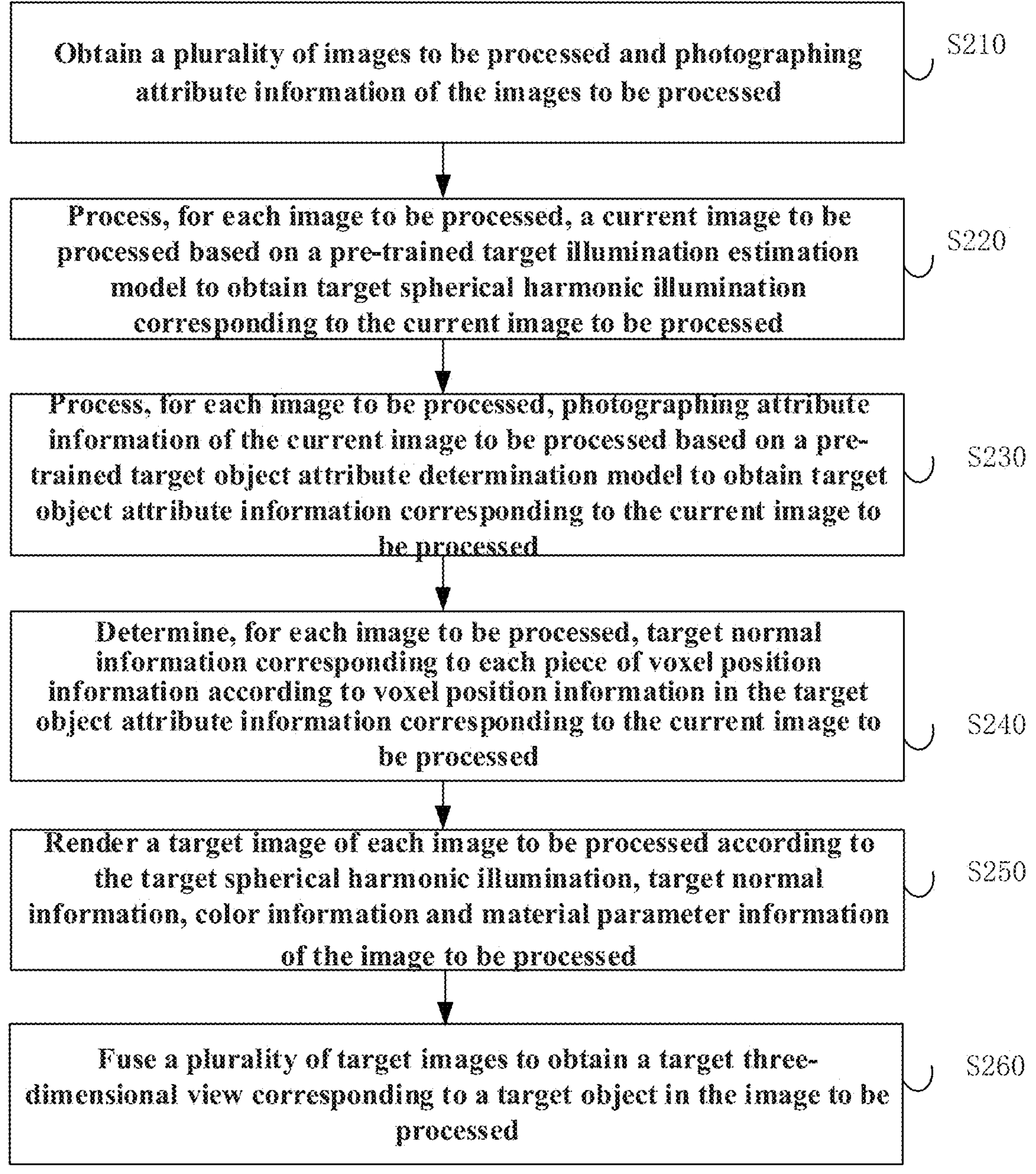
FIG. 2 is a schematic flow diagram of a method for rendering a three-dimensional view according to Embodiment 2 of the disclosure.

FIG. 2 is a schematic flow diagram of a method for rendering a three-dimensional view according to Embodiment 2 of the disclosure. Based on the above example, S140 is described. Reference may be made to the technical solution of the example for the embodiment. Technical terms the same as or corresponding to the above example are not repeated herein.

As shown in FIG. 2, the method includes the following steps:

S210, a plurality of images to be processed and photographing attribute information of the images to be processed are obtained.

S220, for each image to be processed, a current image to be processed is processed based on a pre-trained target illumination estimation model to obtain target spherical harmonic illumination corresponding to the current image to be processed.

S230, for each image to be processed, photographing attribute information of the current image to be processed is processed based on a pre-trained target object attribute determination model to obtain target object attribute information corresponding to the current image to be processed.

S240, for each image to be processed, target normal information corresponding to each piece of voxel position information is determined according to voxel position information in the target object attribute information corresponding to the current image to be processed.

The target normal information may be normal direction information of each point in a target object. A normal may be made on each point of a concave-convex surface of an object, and a normal direction may be marked with a RGB color channel. The normal direction information may be used as the target normal information of the object. In a process of actual application, normal information may generate a normal map, and the normal map may be configured to represent information such as an accurate illumination direction and a reflection effect of a high-detail structure of the object. In this way, in order to make a rendered target three-dimensional view more accurate with the normal information, the normal information corresponding to each piece of voxel position information may be obtained. For instance, when the photographing attribute information of the image to be processed is obtained, any one of the images to be processed may be used as the current image to be processed for illustration. For instance, a camera viewing angle in the photographing attribute information of the current image to be processed is used as an input parameter of the target object attribute determination model to obtain the voxel position information of the target object in the current image to be processed. Further, matching search is conducted with a normal map of normal information obtained by mapping and baking the target object, such that the normal information corresponding to each piece of voxel position information may be determined. The normal information determined is used as the target normal information, and the target object may be rendered in a highly-accurate manner with the target normal information, such that a surface of the target object may have a rendering effect of light and shadow distribution.

In the example, the target normal information corresponding to each voxel position is determined. The target normal information corresponding to each piece of voxel position information may be obtained through differentiation of adjacent voxel position information, such that a corresponding normal map may be determined based on the target normal information corresponding to each piece of voxel position information.

S250, the target image of each image to be processed is rendered according to the target spherical harmonic illumination, target normal information, color information and material parameter information of the image to be processed.

After the above information of each image to be processed is obtained, the target image corresponding to each image to be processed may be rendered based on the above information and the target spherical harmonic illumination of the corresponding image to be processed.

That is, the target image corresponding to each image to be processed may be determined according to the target spherical harmonic illumination, the target normal information, the material parameter information and the color information corresponding to each image to be processed.

S260, obtain a target three-dimensional view corresponding to a target object in the image to be processed by fusing the plurality of target images.

Fusion may include normal information fusion, color information fusion and material parameter information fusion of images. After the plurality of target images corresponding to the plurality of images to be processed are determined, an image fusion operation may be executed.

The plurality of target images may be fused through an image fusion algorithm. The image fusion algorithm may be a principal component analysis (PCA) algorithm or a wavelet transform algorithm. The image fusion algorithm is not limited herein. Further, the target three-dimensional view of the target object in the image to be processed may be generated through a modeling technology, and then a computer server may be connected to display the target three-dimensional view.

The example of the disclosure firstly obtains the plurality of images to be processed and the photographing attribute information of the images to be processed, processes the images to be processed according to the target illumination estimation model so as to obtain target spherical harmonic illumination information, then processes the photographing attribute information according to the target object attribute determination model, obtains object attribute information of the target object, and finally renders the corresponding target image based on the target spherical harmonic illumination and the object attribute information of each image to be processed, such that the corresponding three-dimensional view is rendered based on the plurality of target images. In this way, a technical problem that a rendered image is not consistent with an image of an actual object, which leads to low accuracy of the rendered image and poor user experience in the related art is solved. Not only light source information but also camera position information is considered in a process of rendering an image, such that a corresponding light source position and the material parameter information of the target object are determined, and further the three-dimensional view corresponding to the target object is accurately rendered based on the above information. Accuracy of view rendering is improved, and a more accurate three-dimensional view is displayed on a display interface, which may improve user experience.

Embodiment 3

Figure 3:
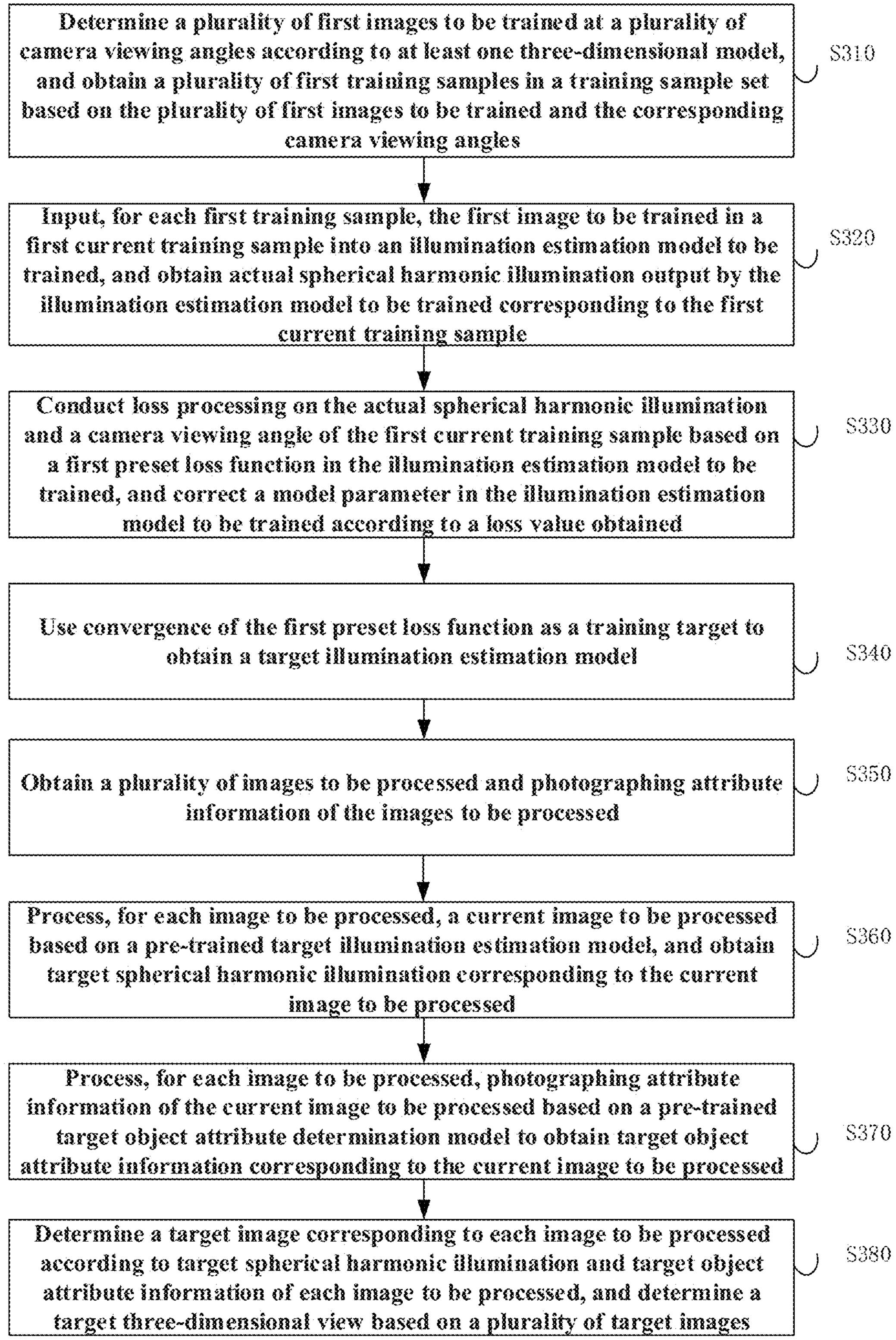
FIG. 3 is a schematic flow diagram of a method for rendering a three-dimensional view according to Embodiment 3 of the disclosure.

FIG. 3 is a schematic flow diagram of a method for rendering a three-dimensional view according to Embodiment 3 of the disclosure. Based on the above example, before a plurality of images to be processed and photographing attribute information of the images to be processed are obtained, an illumination estimation model to be trained may be pre-trained, such that a target illumination estimation model is obtained. Reference may be made to the technical solution of the example for the embodiment. Technical terms the same as or corresponding to the above example are not repeated herein.

As shown in FIG. 3, the method includes the following steps:

S310, a plurality of first images to be trained at a plurality of camera viewing angles are determined according to at least one three-dimensional model, and a plurality of first training samples in a training sample set are obtained based on the plurality of first images to be trained and the corresponding camera viewing angles.

The three-dimensional model may be a polygonal solid representation model of any specific object. The model may include a grid and texture. The grid may be represented by a plurality of point clouds of an object. A three-dimensional model grid may be formed by the point clouds. The point cloud may include three-dimensional coordinates, laser reflection intensity, and color information. The texture may include texture of an object surface. Even if the object surface has uneven grooves, the model further includes color patterns on a smooth surface of the object. For instance, in actual application, a specific object may be translucent jade. Texture information on a jade surface may be scanned through a modeling technology, and then texture is mapped to a grid of the model, such that a texture map on each grid may be obtained. Finally, a three-dimensional model of the jade is formed, and then a training sample of the illumination estimation model to be trained may be obtained with the three-dimensional model.

In order to improve accuracy of model training, images of the three-dimensional model photographed at different camera viewing angles may be obtained, and the images obtained through photographing are used as the first images to be trained. All the first images to be trained are combined to constitute the training sample set. That is, the training sample set includes the plurality of first images to be trained. The first images to be trained are relative but not limited. Meanwhile, camera viewing angle information when each first image to be trained is photographed is recorded. In order to improve accuracy of the trained model, the first images to be trained may be obtained as much as possible. Each first training sample includes the first image to be trained and the camera viewing angle of photographing the first image to be trained. Accordingly, the training sample set may include the plurality of first training samples.

S320, for each first training sample, the first image to be trained in a first current training sample is input into an illumination estimation model to be trained to obtain actual spherical harmonic illumination output by the illumination estimation model to be trained corresponding to the first current training sample.

Each first training sample is trained through S320, such that a required target illumination estimation model may be obtained.

The illumination estimation model to be trained is a model in which a model parameter is an initial parameter or a default parameter. The actual spherical harmonic illumination is spherical harmonic illumination that is output after the first image to be trained in the first current training sample is input into the illumination estimation model to be trained.

The model parameter in the illumination estimation model to be trained does not satisfy expected requirements, such that the actual spherical harmonic illumination output based on the model parameter in this case is different from theoretical spherical harmonic illumination. Therefore, a corresponding error loss value may be determined based on actual spherical harmonic illumination and theoretical spherical harmonic illumination corresponding to each image to be processed.

In the example, the illumination estimation model to be trained may be a residual network (ResNet) model. Spherical harmonic illumination corresponding to the image to be processed may be mainly obtained. That is, a model type is not limited by the example.

S330, loss processing is conducted on the actual spherical harmonic illumination and a camera viewing angle of the first current training sample based on a first preset loss function in the illumination estimation model to be trained, and a model parameter in the illumination estimation model to be trained is corrected according to a loss value obtained.

Before the illumination estimation model to be trained is trained, a training parameter may be set to be a default value. When the illumination estimation model to be trained is trained, the training parameter in the illumination estimation model to be trained may be modified based on an output result of the model. That is, the target illumination estimation model may be obtained by modifying a loss function in the illumination estimation model to be trained. Each image to be processed has a corresponding loss value. The loss value is determined based on actual spherical harmonic illumination and a camera viewing angle of the image to be processed.

After the first image to be trained in the first training sample is input into the illumination estimation model to be trained, the illumination estimation model to be trained may output actual spherical harmonic illumination corresponding to the first image to be trained. According to the actual spherical harmonic illumination and the camera viewing angle, a loss value corresponding to the first image to be trained may be determined, and the model parameter in the illumination estimation model to be trained may be modified through a back propagation method.

S340, convergence of the first preset loss function is used as a training target, and the target illumination estimation model is obtained.

The target illumination estimation model is a model obtained through final training and configured to determine target spherical harmonic illumination of the image to be processed.

A training error of a loss function, that is, a loss parameter, may be used to detect whether the loss function reaches a convergence condition currently, and for instance, whether the training error is smaller than a preset error or whether an error change trend tends to be stable, or whether a current number of iterations is equal to a preset number. In response to detecting that the convergence condition is reached, and for instance, the training error of the loss function is smaller than the preset error or the error change trend tends to be stable, training of the illumination estimation model to be trained is completed. In this case, iterative training may be stopped. In response to detecting that the convergence condition is not reached currently, the first training sample may be obtained to train the illumination estimation model to be trained until the training error of the loss function is within a preset range. When the training error of the loss function reaches the convergence condition, the illumination estimation model to be trained may be used as the target illumination estimation model.

S350, the plurality of images to be processed and the photographing attribute information of the images to be processed are obtained.

S360, for each image to be processed, a current image to be processed is processed based on a pre-trained target illumination estimation model to obtain target spherical harmonic illumination corresponding to the current image to be processed.

S370, for each image to be processed, photographing attribute information of the current image to be processed is processed based on a pre-trained target object attribute determination model to obtain target object attribute information corresponding to the current image to be processed.

S380, a target image corresponding to each image to be processed is determined according to target spherical harmonic illumination and target object attribute information of each image to be processed, and a target three-dimensional view is determined based on a plurality of target images.

According to the technical solution of the example of the disclosure, the target illumination estimation model is pre-trained, and then each image to be processed is processed based on the target illumination estimation model, such that the target spherical harmonic illumination corresponding to each image to be processed may be obtained. Further, the target image corresponding to the image to be processed is determined based on the target spherical harmonic illumination and the target object attribute information of the corresponding image to be processed, such that accuracy and convenience of the determined target image are improved.

Embodiment 4

Figure 4:
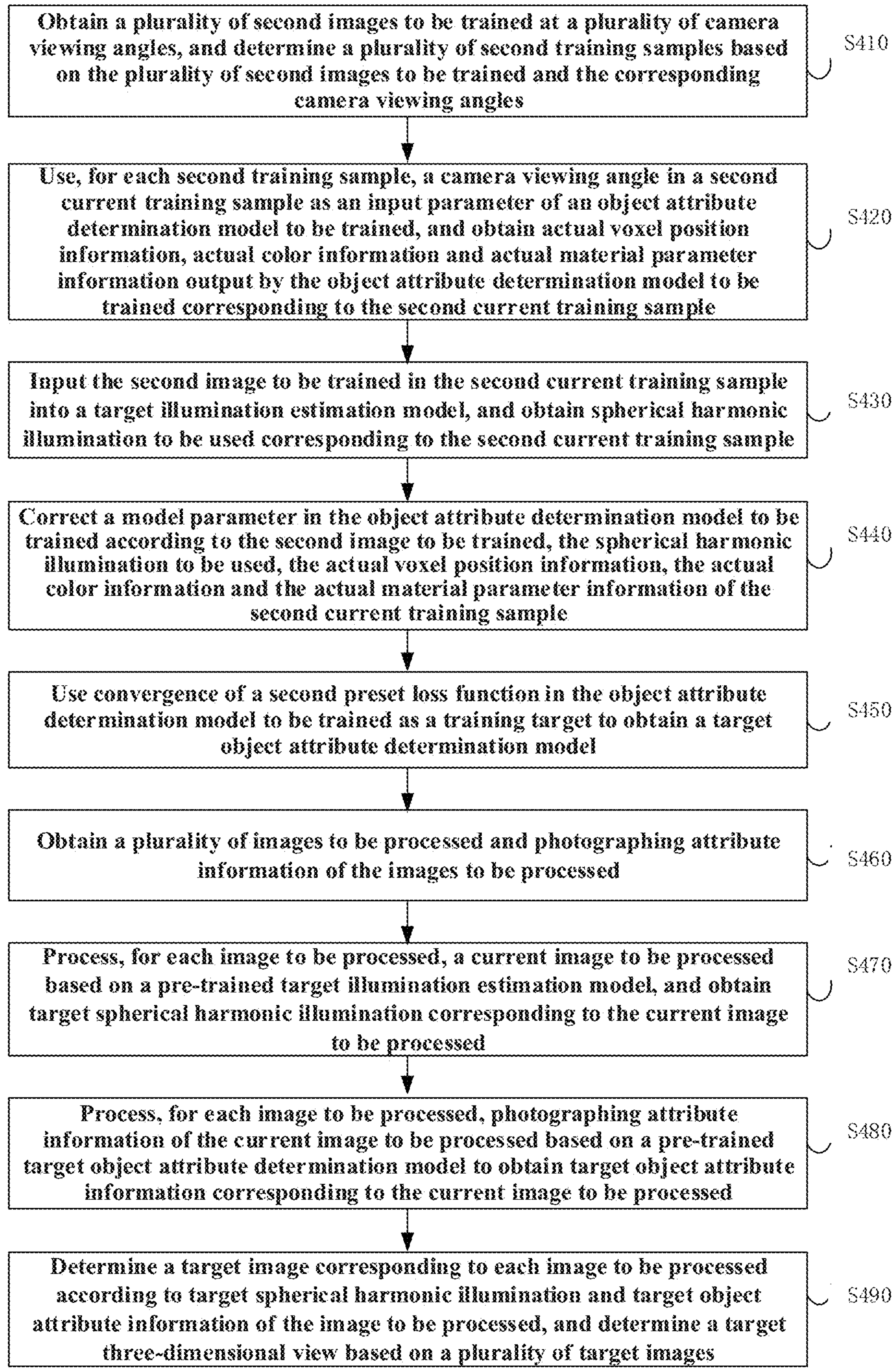
FIG. 4 is a schematic flow diagram of a method for rendering a three-dimensional view according to Embodiment 4 of the disclosure.

FIG. 4 is a schematic flow diagram of a method for rendering a three-dimensional view according to Embodiment 4 of the disclosure. Based on the above example, a target illumination estimation model may be obtained through training, and a target object attribute information determination model may be obtained through training. Reference may be made to the technical solution of the example for the embodiment. Technical terms the same as or corresponding to the above example are not repeated herein.

As shown in FIG. 4, the method includes the following steps:

S410, a plurality of second images to be trained at a plurality of camera viewing angles are obtained, and a plurality of second training samples are determined based on the plurality of second images to be trained and the corresponding camera viewing angles.

First images to be trained in first training samples and the second images to be trained in the second training samples may be the same or different, which are not limited in the example, as long as the images to be trained participate in model training and finally a desired model is obtained.

The second images to be trained are images obtained when a target object is photographed at different camera viewing angles. Meanwhile, the camera viewing angles of photographing the second images to be trained may be recorded. The second images to be trained and the corresponding camera viewing angles may be used as the second training samples. The second training samples and the first training samples are relative, which are only used to distinguish samples participating in different model training. In order to improve accuracy of a trained model, the plurality of second training samples may be obtained as much as possible.

S420, for each second training sample, a camera viewing angle in a second current training sample is used as an input parameter of an object attribute determination model to be trained to obtain actual voxel position information, actual color information and actual material parameter information output by the object attribute determination model to be trained corresponding to the second current training sample.

Each second training sample is trained through S420, such that a required target attribute information determination model may be obtained.

The object attribute determination model to be trained is a model in which a model parameter is an initial parameter or a default parameter. The actual voxel position information, the actual color information and the actual material parameter information are parameter information actually output after a second training image in the second training sample is input into an illumination estimation model to be trained.

A model parameter in the object attribute determination model to be trained does not satisfy expected requirements, such that the actual voxel position information, the actual color information and the actual material parameter information output based on the model parameter in this case are different from theoretical attribute information corresponding to the second image to be trained. Therefore, a corresponding error loss value may be determined based on actual attribute information and theoretical attribute information corresponding to each image to be processed.

In the example, the object attribute determination model to be trained may be a multi-layer perceptron (MLP) model.

The actual voxel position information refers to voxel position information of a target object output by the object attribute determination model to be trained. The actual color information refers to voxel color information of a target object output by the object attribute determination model to be trained. The actual material parameter information refers to material parameter information of a target object output by the object attribute determination model to be trained. For instance, a plurality of second images to be trained of translucent jade and corresponding camera parameter information are obtained.

For each second image to be trained, camera viewing angle information of a second current image to be trained may be input into the object attribute determination model to be trained, and the model may output voxel position information, color information and material parameter information of jade corresponding to the second current image to be trained. The voxel position information may be used as the actual voxel position information, the color information may be used as the actual color information, and the material parameter information may be used as the actual material parameter information. The model parameter in the object attribute determination model to be trained is not an optimal parameter in this case, so information output by the model is different from theoretical attribute information of the jade.

S430, the second image to be trained in the second current training sample is input into the target illumination estimation model to obtain spherical harmonic illumination to be used corresponding to the second current training sample.

In order to determine accuracy of the object attribute determination model to be trained later, spherical harmonic illumination corresponding to the second image to be trained may be determined firstly. Then, a corresponding image is determined and rendered based on the spherical harmonic illumination and actual attribute information output by the object attribute determination model to be trained, and further the model parameter of the model is modified based on the rendered image and the corresponding second image to be trained.

The target illumination estimation model is a pre-trained model. Accordingly, spherical harmonic illumination obtained by processing the second image to be trained based on the target illumination estimation model is used as the spherical harmonic illumination to be used.

S440, a model parameter in the object attribute determination model to be trained is corrected according to the second image to be trained, the spherical harmonic illumination to be used, the actual voxel position information, the actual color information and the actual material parameter information of the second current training sample.

In the example, the spherical harmonic illumination to be used, the actual voxel position information, the actual color information and the actual material parameter information corresponding to the second current training sample may be processed through a modeling technology, such that an actual image corresponding to the second current training sample may be rendered. Because the model parameter in the object attribute determination model to be trained is not completely corrected, the actual image rendered is different from the corresponding second image to be trained. Based on the actual image rendered and the corresponding second image to be trained, an error value may be determined. Further, the model parameter in the object attribute determination model to be trained may be corrected based on the error value.

For instance, the camera viewing angle in the second current training sample is input into the object attribute determination model to be trained, and the actual voxel position information, the actual color information and the actual material parameter information corresponding to the second current training sample are obtained. Then, the second image to be trained in the second current training sample is input into the target illumination estimation model to obtain the spherical harmonic illumination to be used corresponding to the second current training sample. An image may be rendered with the spherical harmonic illumination to be used, the actual voxel position information, the actual color information and the actual material parameter information corresponding to the second current training sample obtained. The rendered image is compared with the second image to be trained in the second current training sample, and an error value is computed. Further, the model parameter in the model is adjusted based on the error value.

The actual image corresponding to the second current training sample is rendered according to the spherical harmonic illumination to be used, the actual voxel position information, the actual color information and the actual material parameter information of the second current training sample. Loss processing is conducted on the second image to be trained and the actual image of the second current training sample based on a second preset loss function in the object attribute determination model to be trained, and the model parameter in the object attribute determination model to be trained is corrected according to a loss result obtained.

The actual image is an image rendered based on actual output of the model.

S450, convergence of the second preset loss function in the object attribute determination model to be trained is used as a training target, and the target object attribute determination model is obtained.

The target object attribute determination model is obtained through final training and configured to determine object attribute information of the image to be processed.

A training error of a loss function, that is, a loss parameter, may be used to detect whether the loss function reaches a convergence condition currently, and for instance, whether the training error is smaller than a preset error or whether an error change trend tends to be stable, or whether a current number of iterations is equal to a preset number. In response to detecting that the convergence condition is reached, and for instance, the training error of the loss function is smaller than the preset error or the error change trend tends to be stable, training of the object attribute determination model to be trained is completed. In this case, iterative training may be stopped. In response to detecting that the convergence condition is not reached currently, the second training sample may be obtained to train the object attribute determination model to be trained until the training error of the loss function is within a preset range. When the training error of the loss function reaches the convergence condition, the object attribute determination model to be trained may be used as the target object attribute determination model.

S460, the plurality of images to be processed and the photographing attribute information of the images to be processed are obtained.

S470, for each image to be processed, a current image to be processed is processed based on a pre-trained target illumination estimation model to obtain target spherical harmonic illumination corresponding to the current image to be processed.

S480, for each image to be processed, photographing attribute information of the current image to be processed is processed based on a pre-trained target object attribute determination model to obtain target object attribute information corresponding to the current image to be processed.

S490, a target image corresponding to each image to be processed is determined according to target spherical harmonic illumination and target object attribute information of the image to be processed, and a target three-dimensional view is determined based on a plurality of target images.

According to the technical solution of the example of the disclosure, the target object attribute determination model is pre-trained, and then the camera viewing angle of each image to be processed is processed based on the target object attribute determination model, such that the object attribute information corresponding to each image to be processed may be obtained. Further, the target image corresponding to the image to be processed is determined based on the target spherical harmonic illumination and the target object attribute information of the corresponding image to be processed, such that accuracy and convenience of the determined target image are improved.

Embodiment 5

Figures 5, 6:
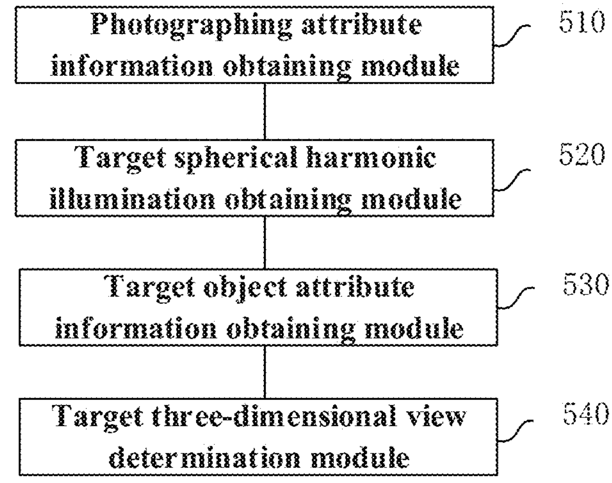
FIG. 5 is a structural block diagram of an apparatus for rendering a three-dimensional view according to Embodiment 5 of the disclosure.
FIG. 6 is a schematic structural diagram of an electronic device according to Embodiment 6 of the disclosure.

FIG. 5 is a structural block diagram of an apparatus for rendering a three-dimensional view according to Embodiment 5 of the disclosure. The apparatus may execute the method for rendering an image according to any one of the examples of the disclosure, and has corresponding functional modules and effects corresponding to execution of the method. As shown in FIG. 5, the apparatus includes: a photographing attribute information obtaining module 510, a target spherical harmonic illumination obtaining module 520, a target object attribute information obtaining module 530, and a target three-dimensional view determination module 540.

The photographing attribute information obtaining module 510 is configured to obtain a plurality of images to be processed and photographing attribute information of the images to be processed. The target spherical harmonic illumination obtaining module 520 is configured to process, for each image to be processed, a current image to be processed based on a pre-trained target illumination estimation model to obtain target spherical harmonic illumination corresponding to the current image to be processed. The target object attribute information obtaining module 530 is configured to process, for each image to be processed, photographing attribute information of the current image to be processed based on a pre-trained target object attribute determination model to obtain target object attribute information corresponding to the current image to be processed. The target three-dimensional view determination module 540 is configured to determine a target image corresponding to each image to be processed according to target spherical harmonic illumination and target object attribute information of each image to be processed, and determine a target three-dimensional view based on a plurality of target images.

Based on the apparatus, the photographing attribute information obtaining module 510 includes a photographing attribute information determination unit.

The photographing attribute information determination unit is configured to determine a camera viewing angle corresponding to the image to be processed, and use the camera viewing angle as the photographing attribute information of the image to be processed.

Based on the apparatus, the target spherical harmonic illumination obtaining module 520 is configured to obtain the target spherical harmonic illumination output by the target illumination estimation model corresponding to the current image to be processed by using the current image to be processed as an input parameter of the target illumination estimation model.

Based on the apparatus, the target object attribute information includes voxel position information, color information, and material parameter information. The target object attribute information obtaining module 530 is configured to obtain at least voxel position information, color information and material parameter information of a target object in the current image to be processed output by the target object attribute determination model by using a camera viewing angle in the photographing attribute information of the current image to be processed as an input parameter of the target object attribute determination model.

Based on the apparatus, the target three-dimensional view determination module 540 includes a target normal information determination unit and a target image determination unit.

The target normal information determination unit is configured to determine, for each image to be processed, target normal information corresponding to each piece of voxel position information according to voxel position information in the target object attribute information corresponding to the current image to be processed. The target image determination unit is configured to render the target image of each image to be processed according to the target spherical harmonic illumination, target normal information, color information and material parameter information of each image to be processed.

Based on the apparatus, the target three-dimensional view determination module 540 further includes a target three-dimensional view obtaining unit.

The target three-dimensional view obtaining unit is configured to fuse the plurality of target images, and obtain a target three-dimensional view corresponding to a target object in the image to be processed.

Based on the apparatus, the apparatus further includes a target illumination estimation model training module. The target illumination estimation model training module includes a first training sample determination unit, an actual spherical harmonic illumination determination unit, a model parameter correction unit, and a target illumination estimation model determination unit.

The first training sample determination unit is configured to determine a plurality of first images to be trained at a plurality of camera viewing angles according to at least one three-dimensional model, and obtain a plurality of first training samples in a training sample set based on the plurality of first images to be trained and the corresponding camera viewing angles. The actual spherical harmonic illumination determination unit is configured to input, for each first training sample, the first image to be trained in a first current training sample into an illumination estimation model to be trained to obtain actual spherical harmonic illumination output by the illumination estimation model to be trained corresponding to the first current training sample. The model parameter correction unit is configured to conduct loss processing on the actual spherical harmonic illumination and a camera viewing angle of the first current training sample based on a first preset loss function in the illumination estimation model to be trained, and correct a model parameter in the illumination estimation model to be trained according to a loss value obtained. The target illumination estimation model determination unit is configured to use convergence of the first preset loss function as a training target to obtain the target illumination estimation model.

Based on the apparatus, the apparatus further includes a target object attribute determination model training module. The target object attribute determination model training module includes a second training sample determination unit, a parameter information obtaining unit, a to-be-used spherical harmonic illumination obtaining unit, a model parameter correction unit, and a target object attribute determination model determination unit.

The second training sample determination unit is configured to obtain a plurality of second images to be trained at a plurality of camera viewing angles, and determine a plurality of second training samples based on the plurality of second images to be trained and the corresponding camera viewing angles. The parameter information obtaining unit is configured to use, for each second training sample, a camera viewing angle in a second current training sample as an input parameter of an object attribute determination model to be trained, and obtain actual voxel position information, actual color information and actual material parameter information output by the object attribute determination model to be trained corresponding to the second current training sample. The to-be-used spherical harmonic illumination obtaining unit is configured to input the second image to be trained in the second current training sample into the target illumination estimation model to obtain spherical harmonic illumination to be used corresponding to the second current training sample. The model parameter correction unit is configured to correct a model parameter in the object attribute determination model to be trained according to the second image to be trained, the spherical harmonic illumination to be used, the actual voxel position information, the actual color information and the actual material parameter information of the second current training sample. The target object attribute determination model determination unit is configured to use convergence of a second preset loss function in the object attribute determination model to be trained as a training target to obtain the target object attribute determination model.

Based on the apparatus, the model parameter correction unit includes an actual image rendering sub-unit and a model parameter correction sub-unit. The actual image rendering sub-unit is configured to render an actual image corresponding to the second current training sample according to the spherical harmonic illumination to be used, the actual voxel position information, the actual color information and the actual material parameter information of the second current training sample. The model parameter correction sub-unit is configured to conduct loss processing on the second image to be trained and the actual image of the second current training sample based on the second preset loss function in the object attribute determination model to be trained, and correct the model parameter in the object attribute determination model to be trained according to a loss result obtained.

The example of the disclosure firstly obtains the plurality of images to be processed and the photographing attribute information of the images to be processed, processes the images to be processed according to the target illumination estimation model so as to obtain target spherical harmonic illumination information, then processes the photographing attribute information according to the target object attribute determination model, obtains object attribute information of the target object, and finally renders the corresponding target image based on the target spherical harmonic illumination and the object attribute information of each image to be processed, such that the corresponding three-dimensional view is rendered based on the plurality of target images. In this way, a technical problem that a rendered image is not consistent with an image of an actual object, which leads to low accuracy of the rendered image and poor user experience in the related art is solved. Not only light source information but also camera position information is considered in a process of rendering an image, such that a corresponding light source position and the material parameter information of the target object are determined, and further the three-dimensional view corresponding to the target object is accurately rendered based on the above information. Accuracy of view rendering is improved, and a more accurate three-dimensional view is displayed on a display interface, which can improve user experience. The apparatus for rendering an image according to the example of the disclosure may execute the method for rendering a three-dimensional view according to any one of the examples of the disclosure, and has corresponding functional modules and effects corresponding to execution of the method.

A plurality of units and modules included in the apparatus are merely divided according to a functional logic, but are not limited to the above division, as long as the corresponding functions may be achieved. In addition, names of a plurality of functional units are merely for convenience of mutual distinguishing, and are not used to limit the protective scope of example of the disclosure.

Embodiment 6

FIG. 6 shows a schematic structural diagram of an electronic device (for instance, a terminal device or a server in FIG. 1) 600 suitable for implementing an example of the disclosure below. The terminal device in the example of the disclosure may be, but is not limited to, a mobile terminal such as a mobile phone, a notebook computer, a digital broadcast receiver, a personal digital assistant (PDA), a portable android device (PAD), a portable media player (PMP), or a vehicle-mounted terminal (for instance, a vehicle-mounted navigation terminal), and a fixed terminal such as a digital television (TV) or a desktop computer. The electronic device 600 shown in FIG. 6 is only illustrative, and is not intended to limit functions and a use scope of the example of the disclosure.

As shown in FIG. 6, the electronic device 600 may include a processing apparatus (for instance, a central processing unit or a graphics processing unit) 601, which may execute various appropriate actions and processing according to a program stored in a read-only memory (ROM) 602 or a program loaded from a storage apparatus 608 to a random access memory (RAM) 603. The RAM 603 further stores various programs and data required for operations of the electronic device 600. The processing apparatus 601, the ROM 602 and the RAM 603 are connected to one another by means of a bus 604. An input/output (I/O) interface 605 is further connected to the bus 604.

Generally, the following apparatuses may be connected to the I/O interface 605: an input apparatus 606 including, for instance, a touch screen, a touch pad, a keyboard, a mouse, a camera, a microphone, an accelerometer, a gyroscope, etc.; an output apparatus 607 including, for instance, a liquid crystal display (LCD), a speaker, a vibrator, etc.; the storage apparatus 608 including, for instance, a magnetic tape, a hard disk, etc.; and a communication apparatus 609. The communication apparatus 609 may allow the electronic device 600 to be in wireless or wired communication with other devices so as to achieve data exchange. Although FIG. 6 shows the electronic device 600 including various apparatuses, not all the apparatuses shown are required to be implemented or included. More or fewer apparatuses may be alternatively implemented or included.

According to the example of the disclosure, the process described above with reference to the flow diagram may be implemented to be a computer software program. For instance, an example of the disclosure includes a computer program product, which includes a computer program born by a non-transitory computer-readable medium. The computer program includes a program code configured to execute the method shown in the flow diagram. In such an example, the computer program may be downloaded and configured from a network through the communication apparatus 609, or configured from the storage apparatus 608, or configured from the ROM 602. The computer program executes the functions defined in the method according to the example of the disclosure when being executed by the processing apparatus 601.

Names of messages or information exchanged between a plurality of apparatuses in the embodiment of the disclosure are only for illustrative purposes, instead of limiting the scope of the messages or information.

The electronic device according to the example of the disclosure belongs to the same concept as the method for rendering a three-dimensional view according to the above examples. Reference may be made to the above examples for technical details not described in detail in the example. The example has the same effect as the above examples.

Example 7

An example of the disclosure provides a computer storage medium, which stores a computer program. The computer program implements the method for rendering a three-dimensional view according to the example when being executed by a processor.

The computer-readable medium described in the disclosure may be a computer-readable signal medium, or a computer-readable storage medium, or any combination thereof. For instance, the computer-readable storage medium may be, but is not limited to, an electronic, magnetic, optical, electromagnetic, infrared, or semiconductor system, apparatus, or device, or any suitable combination thereof. Instances of the computer-readable storage medium may include, but are not limited to, an electrical connection with one or more wires, a portable computer disk, a hard disk, RAM, ROM, an erasable programmable read-only memory (EPROM), a flash memory, an optical fiber, a compact disc read-only memory (CD-ROM), an optical storage device, a magnetic storage device, or any suitable combination thereof. In the disclosure, the computer-readable storage medium may be any tangible medium including or storing a program. The program may be used by or in combination with an instruction execution system, apparatus or device. In the disclosure, the computer-readable signal medium may include a data signal in a baseband or as part of a carrier for transmission, and the data signal carries a computer-readable program code. The transmitted data signal may be in various forms, which may be, but is not limited to, an electromagnetic signal, an optical signal, or any suitable combination thereof. The computer-readable signal medium may further be any computer-readable medium other than the computer-readable storage medium. The computer-readable signal medium may transmit, propagate or transmit a program used by or in combination with an instruction execution system, apparatus or device. The program code included in the computer-readable medium may be transmitted by any suitable medium, including but not limited to an electric wire, an optical cable, radio frequency (RF), etc., or any suitable combination thereof.

In some embodiments, a client and a server may be in communication with each other with any currently known or future-developed network protocol, for instance, a hypertext transfer protocol (HTTP), and may be interconnected with digital data communication (for instance, a communication network) in any form or medium. Instances of the communication network include a local area network (LAN), a wide area network (WAN), the internet work (for instance, the Internet), an end-to-end network (for instance, an ad hoc end-to-end network), and any currently known or future-developed networks.

The computer-readable medium may be included in the electronic device, or may exist independently without being assembled into the electronic device.

The computer-readable medium carries one or more programs. The one or more programs enable, when being executed by the electronic device, the electronic device to:

obtain a plurality of images to be processed and photographing attribute information of the images to be processed; process, for each image to be processed, a current image to be processed based on a pre-trained target illumination estimation model to obtain target spherical harmonic illumination corresponding to the current image to be processed; process, for each image to be processed, photographing attribute information of the current image to be processed based on a pre-trained target object attribute determination model to obtain target object attribute information corresponding to the current image to be processed; and determine a target image corresponding to each image to be processed according to target spherical harmonic illumination and target object attribute information of each image to be processed, and determine a target three-dimensional view based on a plurality of target images.

A computer program code configured to execute an operation of the disclosure may be written in one or more programming languages or a combination thereof. The programming languages include, but are not limited to, object-oriented programming languages such as Java, Smalltalk, and C++, and further include conventional procedural programming languages such as "C" or similar programming languages. The program code may be executed entirely on a user computer, executed partially on a user computer, executed as a stand-alone software package, executed partially on a user computer and partially on a remote computer, or executed entirely on the remote computer or a server. In the case involving the remote computer, the remote computer may be connected to the user computer through any type of networks including the LAN or the WAN, or may be connected to an external computer (for instance, the remote computer is connected through the Internet by an Internet service provider).

The flow diagrams and block diagrams in the accompanying drawings illustrate system structures, functions and operations, which may be achieved according to systems, methods and computer program products in all the examples of the disclosure. In view of that, each block in the flow diagrams or block diagrams may represent a module, a program segment, or part of a code, which includes one or more executable instructions configured to implement specified logic functions. It should further be noted that in some alternative implementations, the functions noted in the blocks may also occur in an order different from that in the accompanying drawings. For instance, the functions represented by two continuous blocks may be actually implemented basically in parallel, or may be implemented in reverse orders, which depends on the involved functions. It should further be noted that each block in the block diagrams and/or flow diagrams and combinations of the blocks in the block diagrams and/or the flow diagrams may be implemented with dedicated hardware-based systems that implement the specified functions or operations, or may be implemented with combinations of dedicated hardware and computer instructions.

The units involved in the examples described in the disclosure may be implemented by software or hardware. Names of the units do not limit the units themselves in a case. For instance, a first obtaining unit may also be described as "a unit obtaining at least two Internet protocol addresses".

The functions described herein may be at least partially executed by one or more hardware logic components. For instance, for the non-limitative purposes, illustrative types of hardware logic components that may be used include: a field programmable gate array (FPGA), an application specific integrated circuit (ASIC), an application specific standard part (ASSP), a system on chip (SOC), a complex programming logic device (CPLD), etc.

In the context of the disclosure, the machine-readable medium may be a tangible medium, which may include or store a program used by or used in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. Instances of the machine-readable storage medium may include an electrical connection based on one or more wires, a portable computer disk, a hard disk, RAM, ROM, EPROM or a flash memory, an optical fiber, CD-ROM, an optical storage device, a magnetic storage device, or any suitable combination thereof.

According to one or more examples of the disclosure, [Instance 1] provides a method for rendering a three-dimensional view. The method includes the following steps:

a plurality of images to be processed and photographing attribute information of the images to be processed are obtained;

for each image to be processed, a current image to be processed is processed based on a pre-trained target illumination estimation model to obtain target spherical harmonic illumination corresponding to the current image to be processed;

for each image to be processed, photographing attribute information of the current image to be processed is processed based on a pre-trained target object attribute determination model to obtain target object attribute information corresponding to the current image to be processed; and a target image corresponding to each image to be processed is determined according to target spherical harmonic illumination and target object attribute information of each image to be processed, and a target three-dimensional view is determined based on a plurality of target images.

According to one or more examples of the disclosure, [Instance 2] provides a method for rendering a three-dimensional view. The method further includes the following steps:

a camera viewing angle corresponding to the image to be processed is determined, and the camera viewing angle is used as the photographing attribute information of the image to be processed.

According to one or more examples of the disclosure, [Instance 3] provides a method for rendering a three-dimensional view. The method further includes the following steps:

obtaining the target spherical harmonic illumination output by the target illumination estimation model corresponding to the current image to be processed by using the current image to be processed as an input parameter of the target illumination estimation model.

According to one or more examples of the disclosure, [Instance 4] provides a method for rendering a three-dimensional view. Further, the target object attribute information includes voxel position information, color information, and material parameter information. The method further includes the following steps: obtaining at least voxel position information, color information and material parameter information of a target object in the current image to be processed output by the target object attribute determination model by using a camera viewing angle in the photographing attribute information of the current image to be processed as an input parameter of the target object attribute determination model.

According to one or more examples of the disclosure, [Instance 5] provides a method for rendering a three-dimensional view. The method further includes the following steps:

for each image to be processed, target normal information corresponding to each piece of voxel position information is determined according to voxel position information in the target object attribute information corresponding to the current image to be processed; and the target image of each image to be processed is rendered according to the target spherical harmonic illumination, target normal information, color information and material parameter information of each image to be processed.

According to one or more examples of the disclosure, [Instance 6] provides a method for rendering a three-dimensional view. The method further includes the following steps:

a target three-dimensional view corresponding to a target object in the image to be processed is obtained by fusing the plurality of target images.

According to one or more examples of the disclosure, [Instance 7] provides a method for rendering a three-dimensional view. The method further includes the following step:

obtain the target illumination estimation model by conducting training.

The step that training is conducted to obtain the target illumination estimation model includes the following steps:

a plurality of first images to be trained at a plurality of camera viewing angles are determined according to at least one three-dimensional model, and a plurality of first training samples in a training sample set are obtained based on the plurality of first images to be trained and the corresponding camera viewing angles;

for each first training sample, the first image to be trained in a first current training sample is input into an illumination estimation model to be trained, and actual spherical harmonic illumination output by the illumination estimation model to be trained corresponding to the first current training sample is obtained;

loss processing is conducted on the actual spherical harmonic illumination and a camera viewing angle of the first current training sample based on a first preset loss function in the illumination estimation model to be trained, and a model parameter in the illumination estimation model to be trained is corrected according to a loss value obtained; and convergence of the first preset loss function is used as a training target, and the target illumination estimation model is obtained.

According to one or more examples of the disclosure, [Instance 8] provides a method for rendering a three-dimensional view. The method further includes the following step:

training is conducted to obtain the target object attribute determination model. The step includes the following steps:

a plurality of second images to be trained at a plurality of camera viewing angles are obtained, and a plurality of second training samples are determined based on the plurality of second images to be trained and the corresponding camera viewing angles;

for each second training sample, a camera viewing angle in a second current training sample is used as an input parameter of an object attribute determination model to be trained, and actual voxel position information, actual color information and actual material parameter information output by the object attribute determination model to be trained corresponding to the second current training sample are obtained;

the second image to be trained in the second current training sample is input into the target illumination estimation model to obtain spherical harmonic illumination to be used corresponding to the second current training sample;

a model parameter in the object attribute determination model to be trained is corrected according to the second image to be trained, the spherical harmonic illumination to be used, the actual voxel position information, the actual color information and the actual material parameter information of the second current training sample; and convergence of a second preset loss function in the object attribute determination model to be trained is used as a training target, and the target object attribute determination model is obtained.

According to one or more examples of the disclosure, [Instance 9] provides a method for rendering a three-dimensional view. The method further includes the following steps:

an actual image corresponding to the second current training sample is rendered according to the spherical harmonic illumination to be used, the actual voxel position information, the actual color information and the actual material parameter information of the second current training sample; and loss processing is conducted on the second image to be trained and the actual image of the second current training sample based on the second preset loss function in the object attribute determination model to be trained, and the model parameter in the object attribute determination model to be trained is corrected according to a loss result obtained.

According to one or more examples of the disclosure, [Instance 10] provides an apparatus for rendering a three-dimensional view. The apparatus includes:

a photographing attribute information obtaining module configured to obtain a plurality of images to be processed and photographing attribute information of the images to be processed;

a target spherical harmonic illumination obtaining module configured to process, for each image to be processed, a current image to be processed based on a pre-trained target illumination estimation model to obtain target spherical harmonic illumination corresponding to the current image to be processed;

a target object attribute information obtaining module configured to process, for each image to be processed, photographing attribute information of the current image to be processed based on a pre-trained target object attribute determination model to obtain target object attribute information corresponding to the current image to be processed; and a target three-dimensional view determination module configured to determine a target image corresponding to each image to be processed according to target spherical harmonic illumination and target object attribute information of each image to be processed, and determine a target three-dimensional view based on a plurality of target images.

Further, although a plurality of operations are depicted in a particular order, it should be understood that the operations are not required to be executed in the particular order shown or in a sequential order. In some cases, multitasking and parallel processing may be advantageous. Likewise, although a plurality of implementation details are included in the above discussion, the details should not be construed as limiting the scope of the disclosure. Some features described in the context of separate examples may also be implemented in combination in a single example. On the contrary, various features described in the context of a single example may also be implemented in a plurality of examples independently or in any suitable sub-combination manner.

What is claimed is:

1. A method for rendering a three-dimensional view, comprising:

obtaining a plurality of images to be processed and photographing attribute information of the images to be processed, wherein obtaining photographing attribute information of the images to be processed comprises: determining a camera viewing angle corresponding to the image to be processed, and using the camera viewing angle as the photographing attribute information of the image to be processed;

processing, for each image to be processed, a current image to be processed based on a pre-trained target illumination estimation model to obtain target spherical harmonic illumination corresponding to the current image to be processed;

processing, for each image to be processed, photographing attribute information of the current image to be processed based on a pre-trained target object attribute determination model to obtain target object attribute information corresponding to the current image to be processed;

determining a target image corresponding to each image to be processed according to target spherical harmonic illumination and target object attribute information of each image to be processed by:

determining, for each image to be processed, target normal information corresponding to each piece of voxel position information according to voxel position information in the target object attribute information corresponding to the current image to be processed; and rendering the target image of each image to be processed according to the target spherical harmonic illumination, target normal information, color information and material parameter information of each image to be processed; and determining a target three-dimensional view based on a plurality of target images.

2. The method of claim 1, wherein processing a current image to be processed based on the pre-trained target illumination estimation model to obtain target spherical harmonic illumination corresponding to the current image to be processed comprises:

obtaining the target spherical harmonic illumination output by the pre-trained target illumination estimation model corresponding to the current image to be processed by using the current image to be processed as an input parameter of the pre-trained target illumination estimation model.

3. The method of claim 1, wherein the target object attribute information at least comprises the voxel position information, the color information and the material parameter information, and processing photographing attribute information of the current image to be processed based on the pre-trained target object attribute determination model to obtain target object attribute information corresponding to the current image to be processed comprises:

obtaining at least voxel position information, color information and material parameter information of a target object in the current image to be processed output by the pre-trained target object attribute determination model by using the camera viewing angle in the photographing attribute information of the current image to be processed as an input parameter of the pre-trained target object attribute determination model.

4. The method of claim 1, wherein determining a target three-dimensional view based on a plurality of target images comprises:

obtaining a target three-dimensional view corresponding to a target object in the image to be processed by fusing the plurality of target images.

5. The method of claim 1, further comprising:

obtaining the pre-trained target illumination estimation model by conducting training, wherein obtaining the pre-trained target illumination estimation model by training comprises:

determining a plurality of first images to be trained at a plurality of camera viewing angles according to at least one three-dimensional model, and obtaining a plurality of first training samples in a training sample set based on the plurality of first images to be trained and the corresponding camera viewing angles;

inputting, for each first training sample, the first image to be trained in a first current training sample into an illumination estimation model to be trained to obtain actual spherical harmonic illumination output by the illumination estimation model to be trained corresponding to the first current training sample;

conducting loss processing on the actual spherical harmonic illumination and the camera viewing angle of the first current training sample based on a first preset loss function in the illumination estimation model to be trained to correct a model parameter in the illumination estimation model to be trained according to a loss value obtained; and using convergence of the first preset loss function as a training target to obtain the pre-trained target illumination estimation model.

6. The method of claim 1, further comprising: obtaining the pre-trained target object attribute determination model by training;

obtaining the pre-trained target object attribute determination model conducting by training comprises:

obtaining a plurality of second images to be trained at a plurality of camera viewing angles, and determining a plurality of second training samples based on the plurality of second images to be trained and the corresponding camera viewing angles;

using, for each second training sample, the camera viewing angle in a second current training sample as an input parameter of an object attribute determination model to be trained to obtain actual voxel position information, actual color information and actual material parameter information output by the object attribute determination model to be trained corresponding to the second current training sample;

inputting the second image to be trained in the second current training sample into the pre-trained target illumination estimation model to obtain spherical harmonic illumination to be used corresponding to the second current training sample;

correcting a model parameter in the object attribute determination model to be trained according to the second image to be trained, the spherical harmonic illumination to be used, the actual voxel position information, the actual color information and the actual material parameter information of the second current training sample; and using convergence of a second preset loss function in the object attribute determination model to be trained as a training target to obtain the pre-trained target object attribute determination model.

7. The method of claim 6, wherein correcting a model parameter in the object attribute determination model to be trained according to the second image to be trained, the spherical harmonic illumination to be used, the actual voxel position information, the actual color information and the actual material parameter information of the second current training sample comprises:

rendering an actual image corresponding to the second current training sample according to the spherical harmonic illumination to be used, the actual voxel position information, the actual color information and the actual material parameter information of the second current training sample; and conducting loss processing on the second image to be trained and the actual image of the second current training sample based on the second preset loss function in the object attribute determination model to be trained to correct the model parameter in the object attribute determination model to be trained according to a loss result obtained.

8. An electronic device, comprising:

at least one processor; and a storage apparatus configured to store at least one program;

wherein when the at least one processor executes the at least one program, the at least one processor is caused to:

obtain a plurality of images to be processed and photographing attribute information of the images to be processed, wherein the electronic device is further caused to obtain photographing attribute information of the images to be processed by: determine a camera viewing angle corresponding to the image to be processed, and using the camera viewing angle as the photographing attribute information of the image to be processed;

process, for each image to be processed, a current image to be processed based on a pre-trained target illumination estimation model to obtain target spherical harmonic illumination corresponding to the current image to be processed;

process, for each image to be processed, photographing attribute information of the current image to be processed based on a pre-trained target object attribute determination model to obtain target object attribute information corresponding to the current image to be processed;

determine a target image corresponding to each image to be processed according to target spherical harmonic illumination and target object attribute information of each image to be processed by:

determining, for each image to be processed, target normal information corresponding to each piece of voxel position information according to voxel position information in the target object attribute information corresponding to the current image to be processed; and rendering the target image of each image to be processed according to the target spherical harmonic illumination, target normal information, color information and material parameter information of each image to be processed; and determining a target three-dimensional view based on a plurality of target images.

9. The electronic device of claim 8, wherein the electronic device is further caused to process a current image to be processed based on the pre-trained target illumination estimation model to obtain target spherical harmonic illumination corresponding to the current image to be processed by:

obtaining the target spherical harmonic illumination output by the pre-trained target illumination estimation model corresponding to the current image to be processed by using the current image to be processed as an input parameter of the pre-trained target illumination estimation model.

10. The electronic device of claim 8, wherein the target object attribute information at least comprises the voxel position information, the color information and the material parameter information, and processing photographing attribute information of the current image to be processed based on the pre-trained target object attribute determination model to obtain target object attribute information corresponding to the current image to be processed comprises:

obtaining at least voxel position information, color information and material parameter information of a target object in the current image to be processed output by the pre-trained target object attribute determination model by using the camera viewing angle in the photographing attribute information of the current image to be processed as an input parameter of the pre-trained target object attribute determination model.

11. The electronic device of claim 8, wherein the electronic device is further caused to determining a target three-dimensional view based on a plurality of target images by:

obtaining a target three-dimensional view corresponding to a target object in the image to be processed by fusing the plurality of target images.

12. The electronic device of claim 8, wherein the electronic device is further caused to:

obtain the pre-trained target illumination estimation model by conducting training, wherein obtain the pre-trained target illumination estimation model by training comprises:

determine a plurality of first images to be trained at a plurality of camera viewing angles according to at least one three-dimensional model, and obtaining a plurality of first training samples in a training sample set based on the plurality of first images to be trained and the corresponding camera viewing angles;

input, for each first training sample, the first image to be trained in a first current training sample into an illumination estimation model to be trained to obtain actual spherical harmonic illumination output by the illumination estimation model to be trained corresponding to the first current training sample;

conduct loss processing on the actual spherical harmonic illumination and the camera viewing angle of the first current training sample based on a first preset loss function in the illumination estimation model to be trained to correct a model parameter in the illumination estimation model to be trained according to a loss value obtained; and use convergence of the first preset loss function as a training target to obtain the pre-trained target illumination estimation model.

13. The electronic device of claim 8, wherein the electronic device is further caused to obtain the pre-trained target object attribute determination model by training;

obtaining the pre-trained target object attribute determination model conducting by training comprises:

obtaining a plurality of second images to be trained at a plurality of camera viewing angles, and determining a plurality of second training samples based on the plurality of second images to be trained and the corresponding camera viewing angles;

using, for each second training sample, the camera viewing angle in a second current training sample as an input parameter of an object attribute determination model to be trained to obtain actual voxel position information, actual color information and actual material parameter information output by the object attribute determination model to be trained corresponding to the second current training sample;

inputting the second image to be trained in the second current training sample into the pre-trained target illumination estimation model to obtain spherical harmonic illumination to be used corresponding to the second current training sample;

correcting a model parameter in the object attribute determination model to be trained according to the second image to be trained, the spherical harmonic illumination to be used, the actual voxel position information, the actual color information and the actual material parameter information of the second current training sample; and using convergence of a second preset loss function in the object attribute determination model to be trained as a training target to obtain the pre-trained target object attribute determination model.

14. The electronic device of claim 12, wherein the electronic device is further caused to correct a model parameter in the object attribute determination model to be trained according to the second image to be trained, the spherical harmonic illumination to be used, the actual voxel position information, the actual color information and the actual material parameter information of the second current training sample by:

rendering an actual image corresponding to the second current training sample according to the spherical harmonic illumination to be used, the actual voxel position information, the actual color information and the actual material parameter information of the second current training sample; and conducting loss processing on the second image to be trained and the actual image of the second current training sample based on the second preset loss function in the object attribute determination model to be trained to correct the model parameter in the object attribute determination model to be trained according to a loss result obtained.

15. A non-transitory computer-readable storage medium, storing a computer program, wherein the computer program when being executed by a processor, causing the processor to:

obtain a plurality of images to be processed and photographing attribute information of the images to be processed, wherein the non-transitory computer-readable storage medium is further caused to obtain photographing attribute information of the images to be processed by: determine a camera viewing angle corresponding to the image to be processed, and using the camera viewing angle as the photographing attribute information of the image to be processed;

process, for each image to be processed, a current image to be processed based on a pre-trained target illumination estimation model to obtain target spherical harmonic illumination corresponding to the current image to be processed;

process, for each image to be processed, photographing attribute information of the current image to be processed based on a pre-trained target object attribute determination model to obtain target object attribute information corresponding to the current image to be processed;

determine a target image corresponding to each image to be processed according to target spherical harmonic illumination and target object attribute information of each image to be processed by:

determining, for each image to be processed, target normal information corresponding to each piece of voxel position information according to voxel position information in the target object attribute information corresponding to the current image to be processed; and rendering the target image of each image to be processed according to the target spherical harmonic illumination, target normal information, color information and material parameter information of each image to be processed; and determine a target three-dimensional view based on a plurality of target images.

* * * * *